United States Patent
Dotson et al.

(10) Patent No.: US 11,412,573 B2
(45) Date of Patent: Aug. 9, 2022

(54) TECHNIQUES FOR PROVIDING WIRELESS ACCESS TO A PROGRAMMABLE LOGIC CONTROLLER IN AN INDUSTRIAL SYSTEM

(71) Applicant: ROCKWELL AUTOMATION TECHNOLOGIES, INC., Mayfield Heights, OH (US)

(72) Inventors: Gary D. Dotson, Muskego, WI (US); Terence S. Tenorio, Solon, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 42 days.

(21) Appl. No.: 16/939,944

(22) Filed: Jul. 27, 2020

(65) Prior Publication Data

US 2022/0030664 A1    Jan. 27, 2022

(51) Int. Cl.
| | | |
|---|---|---|
| *H04W 84/12* | (2009.01) | |
| *H04W 12/06* | (2021.01) | |
| *H04W 12/08* | (2021.01) | |
| *G05B 19/05* | (2006.01) | |
| *H04W 4/80* | (2018.01) | |
| *H04L 9/14* | (2006.01) | |
| *H04L 9/40* | (2022.01) | |

(52) U.S. Cl.
CPC .......... *H04W 84/12* (2013.01); *G05B 19/054* (2013.01); *G05B 19/056* (2013.01); *H04L 9/14* (2013.01); *H04L 63/0823* (2013.01); *H04W 4/80* (2018.02); *H04W 12/06* (2013.01); *H04W 12/08* (2013.01)

(58) Field of Classification Search
CPC .......................... H04W 12/0471; G06F 1/163
USPC ............................................... 455/415, 404.1
See application file for complete search history.

(56) References Cited

U.S. PATENT DOCUMENTS

| | | | |
|---|---|---|---|
| 7,656,846 B2 | 2/2010 | Metts et al. | |
| 2004/0095910 A1* | 5/2004 | Metts .................... | G05B 19/054 370/338 |
| 2018/0242100 A1* | 8/2018 | Gandhi .................. | H04L 69/326 |
| 2020/0154253 A1* | 5/2020 | Won ......................... | H04W 4/80 |
| 2020/0401800 A1* | 12/2020 | LeJeune, Jr. ............ | B64C 19/00 |
| 2021/0075671 A1* | 3/2021 | Li ....................... | H04L 63/0428 |

* cited by examiner

*Primary Examiner* — Kiet M Doan
(74) *Attorney, Agent, or Firm* — Fletcher Yoder, P.C.

(57) ABSTRACT

A non-transitory, computer-readable medium, comprising instructions that when executed by one or more processors, cause the one or more processors to perform operations that include receiving a request to connect to the wireless access point from a computing device. The request includes a private key. The operations may also include comparing the private key to an index of public keys associated with respective users authorized to connect to the wireless access point, determining that the computing device is authorized to connect to the wireless access point based on the comparison, authorizing the computing device to connect to the wireless access point, encrypting maintenance data associated with one or more industrial automation devices, and transmitting the encrypted maintenance data to the computing device via the wireless access point.

16 Claims, 2 Drawing Sheets

Figure 1:
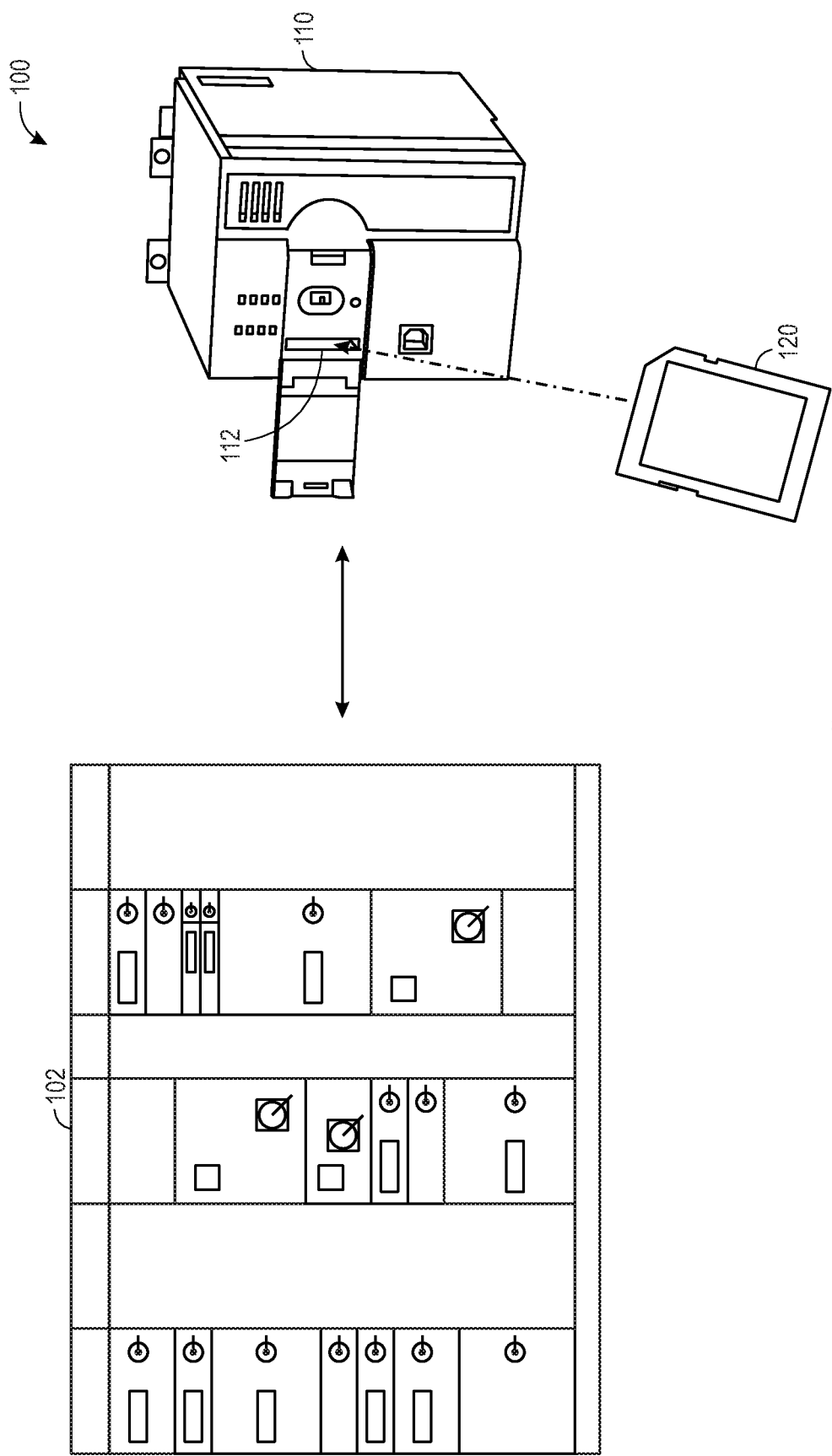

TECHNIQUES FOR PROVIDING WIRELESS ACCESS TO A PROGRAMMABLE LOGIC CONTROLLER IN AN INDUSTRIAL SYSTEM

BACKGROUND

The disclosure relates generally to providing a local wireless access to one or more industrial automation devices. More particularly, embodiments of the present disclosure are related to providing a wireless access point to an industrial automation device via a portable memory device and remotely coupling the computing device to the wireless access point.

Industrial automation devices in an industrial automation system are typically controlled by one or more programmable logic controllers located in one or more control cabinets associated with the industrial automation devices. The control cabinets provide an enclosure for the programmable logic controllers and the circuitry used by the programmable logic controllers to control the industrial automation devices and/or provide power to the industrial automation devices. Maintenance personnel typically access the interior of such cabinets to provide maintenance to the programmable logic controllers within the control cabinets. However, a number of steps may be performed before the maintenance personnel are provided access to the interior of the control cabinets. For example, lock-out, tag-out procedures may be performed to remove power to the programmable logic controllers and the circuity within the control cabinets and the industrial automation devices powered by the programmable logic controllers. As such, it may be desirable to facilitate remote access to the programmable logic controllers from the exterior of the control cabinets to enable users to interact with components within the control cabinets while allowing power to remain available to the programmable logic controllers.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include a programmable logic controller (PLC) and a portable memory device that may couple to the PLC. The portable memory device may include an antenna that may transmit and receive one or more signals, a processor, and a memory, accessible by the processor. The memory may store instructions, that when executed by the processor, cause the processor to perform operations that include receiving a request to connect to the wireless access point from a computing device, determining that the computing device is authorized to connect to the wireless access point based on the request, and authorizing the computing device to connect to the wireless access point in response to determining that the computing device is authorized to connect to the wireless access point.

In another embodiment, a method may include sending, via a portable memory device, a firmware upgrade to a programmable logic controller (PLC) to cause the PLC to interface with the portable media device. The portable media device has an antenna. The method may include receiving, via the portable memory device, a request to connect to the wireless access point from a computing device, determining, via the portable memory device, that the computing device is authorized to connect to the wireless access point based on the request, and authorizing, via the portable memory device, the computing device to connect to the wireless access point in response to determining that the computing device is authorized to connect to the wireless access point.

In yet another embodiment, a non-transitory, computer-readable medium, comprising instructions that when executed by one or more processors, cause the one or more processors to perform operations that include receiving a request to connect to the wireless access point from a computing device. The request includes a private key. The operations may also include comparing the private key to an index of public keys associated with respective users authorized to connect to the wireless access point, determining that the computing device is authorized to connect to the wireless access point based on the comparison, authorizing the computing device to connect to the wireless access point, encrypting maintenance data associated with one or more industrial automation devices, and transmitting the encrypted maintenance data to the computing device via the wireless access point.

DRAWINGS

Figure 2:
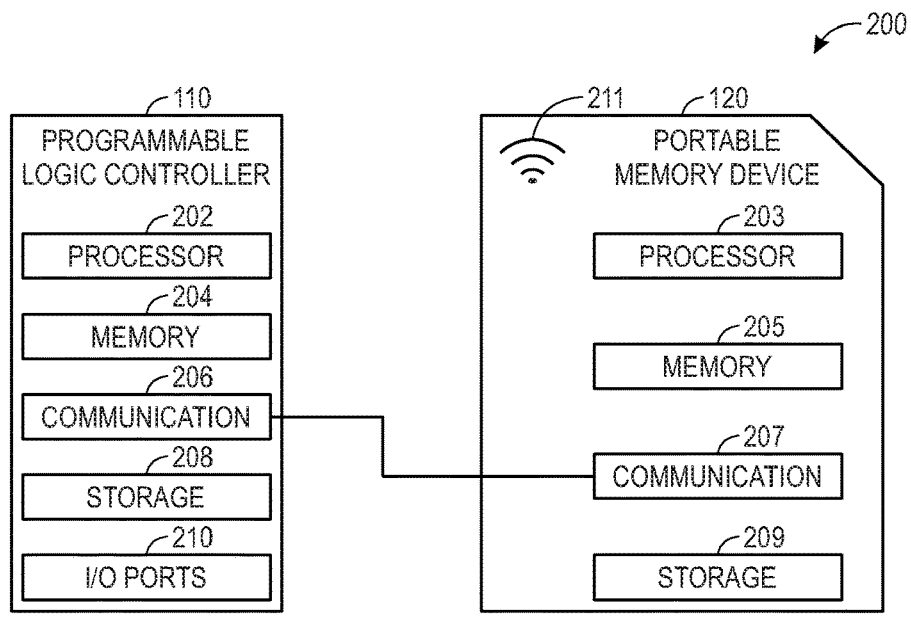
Figure 3:
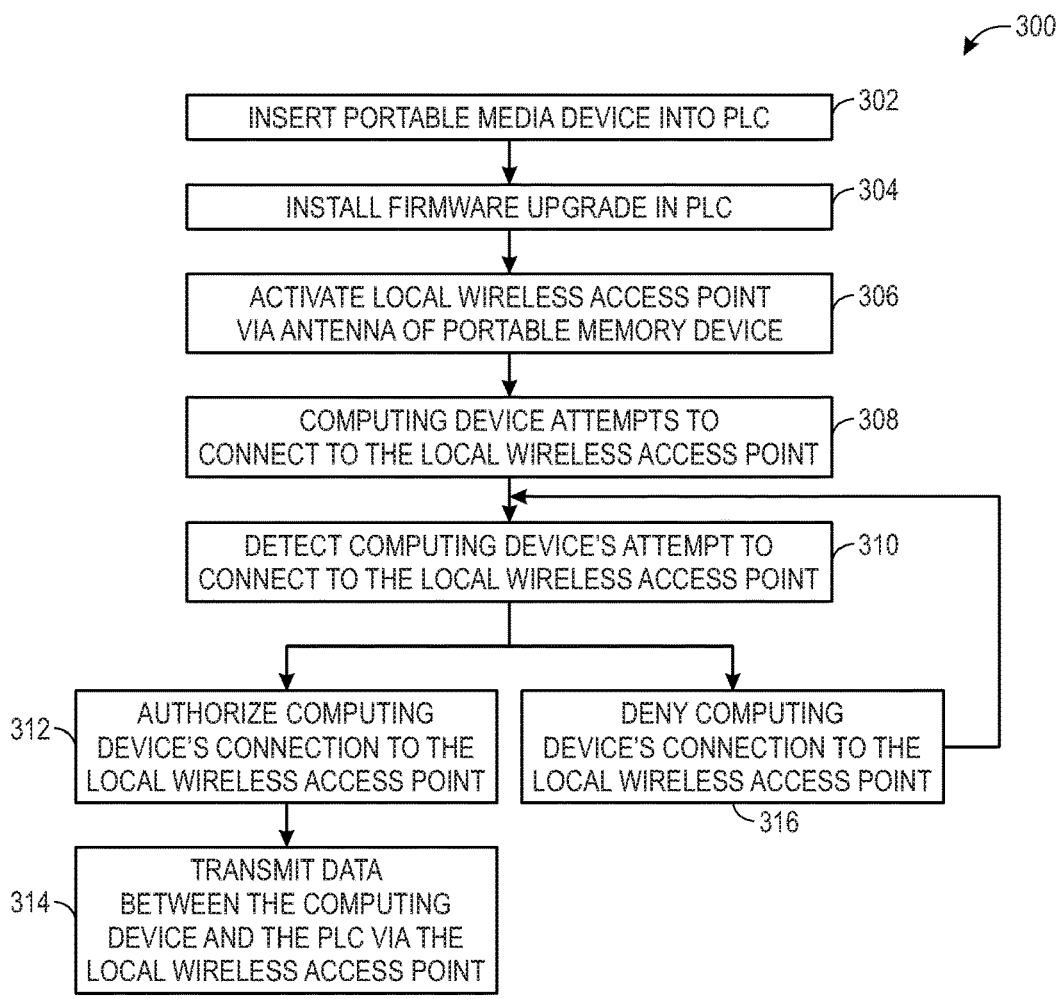

These and other features, aspects, and advantages of the present disclosure may become better understood when the following detailed description is read with reference to the accompanying drawings in which like characters represent like parts throughout the drawings, wherein:

FIG. 1 is a block diagram of an exemplary control cabinet, an exemplary programmable logic controller within the control cabinet, and an exemplary portable memory device that may be utilized with the programmable logic controller, in accordance with an embodiment;

FIG. 2 is a block diagram of the exemplary programmable logic controller communicatively coupled to the exemplary portable memory device, in accordance with an embodiment; and FIG. 3 is a flowchart of a method for configuring the exemplary programmable logic controller to connect a computing device to a local wireless access point activated by the exemplary programmable logic controller, in accordance with an embodiment.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Industrial automation devices in an industrial automation system may be controlled by one or more programmable logic controllers disposed in one or more control cabinets associated with the industrial automation devices. The control cabinets provide an enclosure for the programmable logic controllers and the circuitry used by the programmable logic controllers to control the industrial automation devices and/or provide power to the industrial automation devices. Maintenance personnel typically access the interior of such cabinets to provide maintenance to the programmable logic controllers within the control cabinets. However, a number of steps may be performed before the maintenance personnel are provided access to the interior of the control cabinets. For example, lock-out, tag-out procedures may be performed to remove power to the programmable logic controllers and the circuity within the control cabinets and the industrial automation devices powered by the programmable logic controllers. Additionally, allowing third-party maintenance personnel to access the programmable logic controllers via an enterprise's main infrastructure network may pose possible security risks to the enterprise or one or more industrial automation devices on the enterprise's main infrastructure network. As such, it may be desirable to facilitate local wireless access to the programmable logic controllers from the exterior of the control cabinets.

Accordingly, embodiments of the present disclosure may utilize a portable memory device (e.g., a secure digital (SD) card or a universal serial bus (USB) dongle) with a programmable logic controller (PLC) of an industrial automation device to provide local wireless access to the PLC. For example, the PLC and/or the industrial automation device may be located within a control cabinet in an industrial system. After coupling the portable memory device to the PLC, a user may be able to remotely connect a computing device to a local wireless access point via an antenna provided within the portable memory device, thereby facilitating communication between the computing device and the PLC without opening the control cabinet. In some embodiments, the local wireless access point may be provided via Wi-Fi, Bluetooth®, 3G, 4G, 5G, or Lora, or a combination thereof. In this way, the user may remotely access the PLC without opening the control cabinet or accessing an enterprise's main infrastructure network. Although embodiments of the present disclosure are described with reference to utilizing the portable memory device with the PLC, it should be understood that use of the PLC is exemplary and non-limiting. Other devices, such as human machine interfaces (HMIs), having a portable memory device port, such as an SD slot or USB port, may be used with the portable memory device described herein.

Additionally, the portable memory device may provide various security enhancements to data stored on the portable memory device, to the local wireless access point provided by the portable memory device, and to data transmitted between the PLC and the user's computing device via the local wireless point. For example, the portable memory device may utilize public key/private key encryption to encrypt data stored on the portable memory device, authorize the user's computing device to access the local wireless access point, and encrypt data exchanged between the PLC and the user's computing system. Further, the portable memory device may provide additional storage capabilities to the PLC.

With the foregoing in mind, FIG. 1 is a block diagram 100 of a control cabinet 102 of an industrial system that may contain one or more PLCs 110 that may interface with a portable memory device 120, such as an SD card. For example, after the portable memory device 120 is inserted into the portable memory device port 112 of the PLC 110, the PLC 110 may utilize one or more features of the portable memory device 120. Such features may include providing a local wireless access point to the PLC 110 via an antenna disposed on the portable memory device 120, authenticating a user attempting to connect a computing device to the local wireless access point, storing data in the portable memory device 120, encrypting the data stored in the portable memory device 120, encrypting data transmitted via the local wireless access point, or the like. In some embodiments, the PLC 110 may undergo a firmware upgrade after interfacing with the portable memory device 120. After completion of the firmware upgrade, the PLC 110 may utilize one or more features of the portable memory device 120 as described herein.

As mentioned above, the portable memory device 120 may provide a local wireless access point to the PLC 110. For example, the local wireless access point may be provided via Wi-Fi, Bluetooth®, 3G, 4G, 5G, or Lora, or a combination thereof. In one embodiment, a computing device may connect to the local wireless access point via both Wi-Fi and Bluetooth® protocols. In such an embodiment, the Wi-Fi protocol may provide the computing device with a high-speed data connection to the PLC 110 via the local wireless point. Additionally, simultaneous use of the Bluetooth® connection with the Wi-Fi connection may provide a redundant connection between the computing device and the PLC 110, as well as provide a mechanism for authenticating the connection between the computing device and the PLC 110 and limiting the range of the local wireless access point. For example, certain computing devices within a particular range (e.g., twenty feet to thirty feet) of the local wireless access point may attempt to connect to the local wireless point via both the Wi-Fi and Bluetooth® protocols.

After a computing device has connected to the PLC 110 via the local wireless access point, the PLC 110 may transmit data associated with the PLC 110 or one or more industrial automation devices associated with the PLC 110 to the computing device via the local wireless access point. For example, the PLC 110 may transmit maintenance information (e.g., an active maintenance status) associated with the PLC 110, the industrial automation devices, or both. In some embodiments, the active maintenance status of the PLC 110 or the industrial automation devices may indicate that the PLC 110 or the industrial automation devices have a fault, that the PLC 110 or the industrial automation devices have experienced a communication loss, that the PLC 110 or the industrial automation devices are undergoing testing, a general warning that there may be some problem with the PLC 110 or the industrial automation devices (e.g., error codes), or the like. In some embodiments, the PLC 110 may encrypt the data transmitted to the computing device via the local wireless access point using public key/private key encryption or the like.

The portable memory device 120 may also be used to authenticate a user attempting to connect a computing device to the local wireless access point. For example, the portable memory device 120 may contain an index of public keys associated with respective private keys and corresponding users that have been authorized to connect respective computing devices to the local wireless access point. After the portable memory device 120 has interfaced with the PLC 110, the PLC 110 may receive the index of public keys from the portable memory device 120. Thereafter, in response to a user attempting to connect the user's computing device to the local wireless access point (e.g., via Wi-Fi, Bluetooth®, or both), the PLC 110 may request a private key from the user's computing device via the local wireless access point. After receiving the private key from the user's computing device, the PLC 110 may compare the private key to the index of public keys. If the PLC 110 determines a match between the private kay and a particular public key, the PLC 110 may permit the user to connect the user's computing device to the wireless access point.

In some embodiments, the portable memory device 120 may be paired with a communication device (e.g., an additional portable memory device or other hardware device) coupled to the computing device. For example, after the user has coupled the communication device to the computing device (e.g., via interfacing the communication device via a port of the computing device or the like), the communication device may detect the wireless access point provided by the portable memory device 120. After detecting the wireless access point, the communication device may connect to the wireless access point provided by the portable memory device 120. In one embodiment, the communication device may prompt the user to submit authentication information before or after the communication device connects to the wireless access point. In another embodiment, the communication device may have access to the user's authentication information in a memory accessible by the communication device. In such an embodiment, the communication device may automatically connect to the wireless access point after detecting the wireless access point. In some embodiments, the communication device and the portable memory device 120 may also encrypt data transmitted between the communication device and the portable memory device 120 via the local wireless access point (e.g., using public key/private key encryption or the like).

In some embodiments, the portable memory device 120 may be used by the PLC 110 as a bulk retentive storage device. For example, a memory of the portable memory device 120 may have a capacity of 2 gigabytes (GB), 8 GB, 32 GB, or the like. The PLC 110 may store various types of data in the portable memory device 120. For example, the PLC 110 may log one or more commands sent by the PLC 110 to the industrial automation devices associated with the PLC 110, one or more parameters associated with the industrial automation devices, one or more maintenance statuses of the PLC 110 or the industrial automation devices, or the like. In some embodiments, the PLC 110 may encrypt the data stored in the portable memory device 120. For example, the PLC 110 may encrypt the data using public key/private key encryption or the like.

In the industrial system, the PLC 110 in the control cabinet 102 may be associated with one or more types of industrial automation equipment. The industrial automation equipment may take many forms and may include industrial automation devices for accomplishing many different and varied purposes. For example, the industrial automation equipment may include machinery used to perform various operations in a compression station, an oil refinery, a bath operation for making food items, a mechanical assembly line, and so forth. Accordingly, the industrial automation equipment may include any component or part (i.e., an industrial automation device) that performs a specific operation for a respective industrial automation equipment, such as electric motors, valves, actuators, temperature elements, pressure sensors, controllers, input/output (I/O) modules, human machine interfaces (HMIs), operator interfaces, contactors, starters, sensors, drives, relays, protection devices, switchgear, compressors, network switches (e.g., Ethernet switches, modular-managed, fixed-managed, service-router, industrial, unmanaged, etc.), or a myriad of machinery or devices used for manufacturing, processing, material handling, and other applications. Additionally, the industrial automation equipment may include various types of equipment that may be used to perform the various operations that may be part of an industrial application. For instance, the industrial automation equipment may include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like.

The industrial automation equipment may include a computing device and/or a communication component that enables the industrial automation equipment to communicate data between each other and other devices, such as the PLCs 110, in the industrial system via a communication network that is different than the local wireless access point provided by the portable memory device 120. For example, the industrial automation equipment may include a communication component that includes a network interface that permits the industrial automation equipment to communicate via various protocols such as EtherNet/IP, ControlNet, DeviceNet, or any other industrial communication network protocol. Alternatively, the communication component may enable the industrial automation equipment to communicate via various wired or wireless communication protocols, such as Wi-Fi, mobile telecommunications technology (e.g., 2G, 3G, 4G, 5G, or LTE), Bluetooth®, near-field-communications technology, and the like.

To perform some of the actions set forth above, the PLC 110 and the portable memory device 120 may include certain embodiments to facilitate these actions. FIG. 2 is a block diagram of example components within the PLC 110 and the portable memory device 120. For example, the PLC 110 may include a processor 202, a memory 204, a communication component 206, a storage 208, input/output (I/O) ports 210, and the like. Additionally, the portable media device 120 may include a processor 203, a memory 205, a communication component 207, a storage 209, an antenna 211, and the like. For example, such components of the portable media device 120 may be located on a single printed circuit board assembly within the portable media device 120. The processor 202 of the PLC 110 and the processor 203 of the portable media device 120 may be any type of computer processor or microprocessor capable of executing computer-executable code. The processor 202 of the PLC 110 and/or the processor 203 of the portable media device 120 may also include multiple processors that may perform the operations described below.

The memory 204 of the PLC 110, the memory 205 of the portable memory device 120, the storage 208 of the PLC 110, and the storage 209 of the portable memory device 120 may be any suitable articles of manufacture that can serve as media to store processor-executable code, data, or the like. These articles of manufacture may represent non-transitory computer-readable media (e.g., any suitable form of memory or storage) that may store the processor-executable code used by the processor 202 of the PLC 110 or the processor 203 of the portable media device 120 to perform the presently disclosed techniques. It should be noted that "non-transitory" merely indicates that the media is tangible and not a signal. The memory 204 of the PLC 110, the memory 205 of the portable memory device 120, the storage 208 of the PLC 110, and the storage 209 of the portable memory device 120 may also be used to store data, encryption keys, and the like.

The communication component 206 of the PLC 110 and the communication component 207 of the portable memory device 120 may be a wireless or wired communication component that may facilitate communication between the PLC 110 and the portable media device 120. For example, the portable memory device 120 may receive data from the PLC 110 and transmit the received data to a computing device communicatively coupled to the portable memory device via a local wireless access point provided by an antenna 211 (e.g., a 2.4 GHz antenna or a 5 GHz antenna) of the portable memory device 120. In some embodiments, the antenna 211 may be a microstrip antenna, a printed antenna, a patch antenna, or the like. For example, the antenna 211 may be fabricated using microstrip techniques on a printed circuit board of the portable memory device 120. The antenna 211 may consist of a patch of metallic foil on the surface of the printed circuit board and have a two-dimensional array. In this way, the antenna 211 may have a suitable size to fit within the portable memory device 120. In some embodiments, a portion of the PLC 110 (e.g., a door to the portable memory device port 112) may include a window to facilitate transmission of the local wireless network through the PLC 110, the control cabinet 102, or a combination thereof. For instance, the material composition and/or the structure of the PLC 110 may inhibit wireless transmission of the wireless network. In such cases, a window may located in a portion of the PLC 110, a portion of the control cabinet 102, or a combination thereof, to facilitate suitable transmission of the local wireless network and subsequent connection to the local wireless network by the computing device. Additionally, or alternatively, an external antenna may be used in place of the antenna 211 or in conjunction with the antenna 211 to provide the local wireless access point. For example, an antenna external to the portable memory device 120, but communicatively coupled to the portable memory device 120, may be located on a portion (e.g., a door to the portable memory device port 112) of the PLC 110 or the control cabinet 102. Such antennas may include an external foil antenna, a SubMiniature version A (SMA) antenna, or the like.

In some embodiments, the local wireless access point may be provided via Wi-Fi, Bluetooth®, 3G, 4G, 5G, or Lora, or a combination thereof. In addition, the portable memory device 120 may receive data from the PLC 110 via physical pins or contacts that are part of the portable memory device port 112 and the portable memory device 120. That is, when the portable memory device 120 is inserted into the portable memory device port 112, electrical traces or contacts that are part of the portable memory device 120 may interlock or connect to electrical prongs or contacts that are part of the portable memory device port 112. These connections may be used to enable communication between the two devices, as well as provide power from the PLC 110 to the portable memory device 120.

The PLC 110 may also receive data from the portable media device 120. For example, the PLC 110 may receive one or more public keys associated with one or more private keys that correspond to users authorized to access the PLC 110 via the local wireless access point. The PLC 110 may also receive a firmware upgrade or other data from the portable media device 120. Additionally, the communication component 206 of the PLC 110 may facilitate communication between the PLC 110 and one or more industrial automation devices. For example, the PLC 110 may receive data associated with the industrial automation devices and generate one or more corresponding maintenance statuses or error codes for the industrial automation devices based on the received data.

With the foregoing in mind, FIG. 3 illustrates a flowchart of a method 300 for configuring the PLC 110 to interface with the portable memory device 120, activating a local wireless access point to the PLC 110 via the antenna 211 of the portable memory device 120, and connecting a user's computing device to the local wireless access point to access the PLC 110. Although the following description of the method 300 is described in a particular order, it should be noted that the method 300 is not limited to the depicted order, and instead, the method 300 may be performed in any suitable order. Additionally, although the portable media device 120 is described as performing certain processes of the method 300 herein, it should be understood that the PLC 110 may perform one or more of such processes instead of the portable media device 120.

Referring to FIG. 3, at block 302, the portable media device 120 may detect that it is inserted into the portable media device port 112 in the PLC 110. For example, the portable media device 120 may receive a response containing identification information associated with the PLC 110 from the PLC 110 after the portable media device 120 has been inserted into the portable media device port 112. In some embodiments, the portable media device 120 may have a form factor or a physical shape that corresponds to an SD card, a USB dongle, or the like.

After the portable media device 120 is inserted into the portable media device port 112, at block 304, the portable media device 120 may optionally install or send a firmware upgrade in or to the PLC 110. The firmware upgrade may be stored in the memory 205 or the storage 209 of the portable media device 120 and may be transmitted to the PLC 110 in response to detecting that the PLC is communicatively coupled to the portable media device 120. In some embodiments, the memory 205 or the storage 209 may store firmware upgrades or other software for a variety of types of PLCs 110 or other industrial equipment. As such, upon detecting the type of equipment (e.g., PLC 110) that is communicatively coupled to the portable media device 120, the portable media device 120 may transmit the appropriate package to the respective equipment. For example, the PLC 110 may not be configured to interface with the components of the portable media device 120 before the portable media device 120 is inserted into the portable media device port 112 in the PLC 110. After the portable media device 120 is inserted into the portable media device port 112 and the PLC 110 receives the firmware upgrade from the portable media device 120, the PLC 110 may install the firmware upgrade to permit the PLC 110 to interface with the portable media device 120. Alternatively, if the PLC 110 is already configured to interface with the components of the portable media device 120, the process at block 304 may be skipped.

After the PLC 110 establishes a communication channel with the portable memory device 120, a local wireless access point may be activated via the antenna 211 the portable memory device 120 at block 306. The local wireless access point may be provided via Wi-Fi, Bluetooth®, 3G, 4G, 5G, or Lora, or a combination thereof. In some embodiments, the PLC 110 may activate the local wireless access point via the antenna 211 of the portable memory device 120 at block 306. For instance, the PLC 110 may transmit a command to the portable memory device 120 to provide power to the antenna 211 and provide the local wireless access point via Wi-Fi and Bluetooth®. In other embodiments, the portable memory device 120 may provide power to the antenna 211 to activate the local wireless point after detecting the communication channel with the PLC 110. While the local wireless access point is activated, the processor 203 of the portable memory device 120 may activate as a transceiver such that the processor 203 may receive data from the antenna 211 of the portable memory device 120 and/or transmit data via the antenna 211 of the portable memory device 120. After receiving the command from the PLC 110 to activate the local wireless point, the processor 203 may establish an internet protocol (IP) address, a network address, or the like.

Thereafter, at block 308, a user may attempt to connect a user's computing device to the local wireless access point within a particular range of the antenna 211 of the portable memory device 120. For example, the range of the local wireless access point may depend on the particular communication protocols associated with the local wireless access point. In some embodiments, the range may be five feet, ten feet, twenty feet, thirty feet, forty feet, fifty feet, or any other suitable range. For instance, the range of the local wireless access point may be suitable to maintain a redundant connection between the computing device and the local wireless access point using both Wi-Fi and Bluetooth®.

At block 310, the portable media device 120 may detect the computing device's attempt to connect to the local wireless access point and authorize or deny the computing device's connection to the local wireless access point. For example, the computing device may send a request to connect to the local wireless access point to the portable media device 120 via a temporary connection to the local wireless access point. The temporary connection may provide the computing device with limited access to the local wireless access point. For example, the computing device may temporarily connect to the local wireless access point in order to authorize the connection between the computing device and the local wireless access point.

In some embodiments, the request to connect to the local wireless access point may include credentials associated with the user of the computing device, such as a username, password, private key, an identifier of the computing device, or the like. The portable media device 120 may compare the credentials in the received request to an index of authorized users, authorized devices, or the like, in the memory 204 or storage 208 of the PLC and/or the memory 205 or storage 208 of the portable media device 120, respectively. In some embodiments, the portable media device 120 may use public key/private key authentication or any other suitable authentication methodology to authorize the computing device's connection to the local wireless access point or deny the computing device's connection to the local wireless access point.

If the portable media device 120 determines that the credentials in the received request correspond to an authorized user or an authorized device, at block 312, the portable media device 120 may authorize the computing device to maintain a semi-permanent connection to the local wireless access point. For example, "semi-permanent" may refer to the computing device's connection to the local wireless access point until the computing device disconnects from the local wireless access point, the antenna 211 of the portable media device 120 powering down to deactivate the local wireless access point, or the like. Thereafter, at block 314, the computing device may access the PLC 110 via the local wireless access point. For example, a graphical user interface associated with the PLC 110 may be generated and transmitted to the computing device via the local wireless access point for display by the computing device. The graphical user interface may display data associated with the PLC 110 and/or one or more industrial automation devices managed or controlled by the PLC 110.

In some embodiments, the data associated with the PLC 110 and/or the industrial automation devices may include maintenance information (e.g., an active maintenance status) associated with the PLC 110, the industrial automation devices, or both. For example, the maintenance information may include respective active maintenance statuses of the PLC 110 or the industrial automation devices that indicate that the PLC 110 or the industrial automation devices have a fault, that the PLC 110 or the industrial automation devices have experienced a communication loss, that the PLC 110 or the industrial automation devices are undergoing testing, a general warning that there may be some problem with the PLC 110 or the industrial automation devices (e.g., error codes), or the like. In some embodiments, the PLC 110 may encrypt the data transmitted to the computing device via the local wireless access point using public key/private key encryption or the like.

Alternatively, if the portable media device 120 determines to deny the computing device's connection to the local wireless access point because the computing device is not authorized, at block 316, the portable media device 120 may detect an additional attempt to connect to the local wireless access point by the user's computing device or a different computing device. The process at block 310 may then be performed to determine whether to authorize the corresponding computing device's connection to the local wireless access point based on credentials received from the corresponding computing device in a request to access the local wireless access point. In some embodiments, the portable media device 120 may process attempts to connect to the local wireless access point by different computing devices simultaneously. In other embodiments, the portable media device 120 may process attempts to connect to the local wireless access point sequentially in order to limit a quantity of computing devices connected to the local wireless access point. For instance, after a threshold of authorized computing devices have connected to the local wireless access point, additional computing devices attempting to connect to the local wireless access point may be directed to a waiting queue until one or more of the authorized computing devices has disconnected from the local wireless access point.

It should be understood that certain processes described herein with regard to method 300 may be performed while the control cabinet 102 housing the PLC 110 is either open or closed. For example, the control cabinet 102 housing the PLC 110 may be open to facilitate insertion of the portable media device 120 into the PLC 110 at block 302. Thereafter, the processes described at blocks 304-316 may be performed while the control cabinet 102 housing the PLC is closed. For example, power to the PLC 110 and any industrial automation devices within the control cabinet 102 may be disconnected in order to facilitate insertion of the portable media device 120 into the PLC 110 while the control cabinet 102 is open at block 302. After the portable media device 120 has been inserted into the PLC 110, the control cabinet 102 may be closed and power may be restored to the PLC 110 and the industrial automation devices within the control cabinet 102. Thereafter, the processes described at blocks 304-316 may be performed while the control cabinet is closed and power is provided to the PLC 110. Additionally, as mentioned above, the portable media device 120 is described as performing certain processes of the method 300 herein. However, it should be understood that the PLC 110 may perform one or more of such processes instead of the portable media device 120. For example, the PLC 110 may authorize the computing device to maintain a semi-permanent connection to the local wireless access point at block 312 via the communication channel (e.g., portable memory device port 112) to the portable memory device 120.

In some embodiments, the portable memory device 120 may be used to store data associated with the PLC 110 and/or the portable memory device 120. For example, the PLC 110 and/or the portable memory device 120 may log each computing device that attempted to access the local wireless access point and whether the computing device's connection of the local wireless access point was authorized or denied in the portable memory device 120. Additionally, the PLC 110 and/or the portable memory device 120 may log the maintenance status of the PLC 110 and/or one or more industrial automation devices controlled or managed by the PLC 110 in the portable memory device 120 over time. The PLC 110 may also retrieve data from the portable memory device 120. For example, the PLC 110 may receive security keys (e.g., public keys or private keys) from the portable memory device 120 for performing public key/private key encryption of data transmitted via the local wireless access point to one or more computing devices or performing public key/private key decryption of data received via the local wireless access point to one or more computing devices. Further, the PLC 110 may receive one or more licenses associated with the industrial automation devices in the industrial system from the portable media device 120. For example, each license may define the authorized operation of one or more industrial automation devices in the industrial system. After receiving a license from the portable media device 120, the PLC 110 may control or manage one or more industrial automation devices in accordance with the license. In some embodiments, the PLC 110 may automatically adjust an operation performed by one or more industrial automation devices to adhere to the operational definition provided in the received license.

Technical effects of the present disclosure include techniques for utilizing a portable memory device with a PLC to provide local wireless access to the PLC such that a user may remotely access the PLC without opening the control cabinet or accessing an enterprise's main infrastructure network. For example, the PLC may be located within a control cabinet in an industrial system. After coupling the portable memory device to the PLC, a user may be able to remotely connect a computing device to a local wireless access point provided by an antenna within the portable memory device without opening the control cabinet. Additionally, the portable memory device may provide various security enhancements to data stored on the portable memory device, the local wireless access point provided by the portable memory device, and data transmitted between the PLC and the user's computing device via the local wireless point. For example, the portable memory device may utilize public key/private key encryption to encrypt data stored on the portable memory device, authorize the user's computing device to access the local wireless access point, and encrypt data exchanged between the PLC and the user's computing system. Further, the portable memory device may provide additional storage capabilities to the PLC.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

What is claimed is:

1. A system, comprising:
a programmable logic controller (PLC); and
a portable memory device distinct from the PLC, the portable memory device configured to couple to the PLC, wherein the portable memory devices comprises:
an antenna configured to transmit and receive one or more signals;
a processor; and
a memory, accessible by the processor, the memory storing instructions, that when executed by the processor, cause the processor to perform operations, comprising:
after coupling to the PLC:
receiving, by the antenna of the portable memory device, a request to connect to a wireless access point to the PLC, from a computing device external to the PLC and the portable memory device;
determining that the computing device is authorized to connect to the wireless access point based on the request; and
granting the computing device access to connect to the wireless access point in response to determining that the computing device is authorized to connect to the wireless access point.

2. The system of claim 1, wherein the operations comprise transmitting maintenance data from the PLC to the computing device via the wireless access point, wherein the maintenance data comprises one or more maintenance statuses associated with one or more industrial automation devices that corresponds with the PLC.

3. The system of claim 2, wherein the maintenance data transmitted from the PLC to the computing device via the wireless access point is encrypted.

4. The system of claim 1, wherein the request to connect to the wireless access point comprises a private key, and wherein determining that the computing device is authorized to connect to the wireless access point comprises authenticating the computing device using a public key/private key authentication method based on the private key.

5. The system of claim 1, wherein the operations comprise logging the request by the computing device to connect to the wireless access point in the memory.

6. The system of claim 1, wherein the operations comprise logging authorization of the computing device to connect to the wireless access point in the memory.

7. The system of claim 1, wherein the antenna is configured to provide the wireless access point via Wi-Fi, Bluetooth®, 3G, 4G, 5G, or Lora, or a combination thereof.

8. The system of claim 1, wherein a range of the wireless access point is less than forty feet.

9. The system of claim 1, wherein the portable memory device is a secure digital (SD) card.

10. The system of claim 1, wherein the request to connect to the wireless access point from the computing device is received from an SD card coupled to the computing device.

11. A method, comprising:
sending, from a portable memory device coupled to a programmable logic controller (PLC) distinct from the portable memory device, a firmware upgrade to the PLC to cause the PLC to interface with the portable memory device, wherein the portable memory device comprises an antenna;
receiving, by the antenna of the portable memory device, a request to connect to a wireless access point to the PLC, from a computing device external to the portable memory device and the PLC;
determining, via the portable memory device, that the computing device is authorized to connect to the wireless access point based on the request; and
granting, via the portable memory device, access to the computing device to connect to the wireless access point in response to determining that the computing device is authorized to connect to the wireless access point.

12. The method of claim 11, comprising transmitting, by the portable memory device, maintenance data from the PLC to the computing device via the wireless access point, wherein the maintenance data comprises one or more active maintenance statuses associated with one or more industrial automation devices that corresponds with the PLC.

13. The method of claim 12, comprising encrypting, by the portable memory device, the maintenance data before transmitting the maintenance data to the computing device via the wireless access point.

14. The method of claim 11, wherein the request to connect to the wireless access point is received from the computing device via a temporary connection to the wireless access point, wherein access by the computing device to the wireless access point is limited via the temporary connection.

15. The method of claim 11, comprising sending, via the portable memory device, a license to the PLC, wherein the license defines an authorized operation of an industrial automation device associated with the PLC.

16. The method of claim 15, comprising transmitting, via the portable memory device, a command to the PLC, wherein the command is configured to adjust an operation performed by the industrial automation device in accordance with the authorized operation defined in the license.

* * * * *